(12) United States Patent
Lee et al.

(10) Patent No.: US 10,489,714 B2
(45) Date of Patent: *Nov. 26, 2019

(54) FINGERPRINTING AND MATCHING LOG STREAMS

(71) Applicant: International Business Machines Corporation, Armonk, NY (US)

(72) Inventors: Tien Hiong Lee, Singapore (SG); Konstantin Levinski, Singapore (SG); Harjoben Singh, Singapore (SG); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 837 days.

This patent is subject to a terminal disclaimer.

(21) Appl. No.: 14/671,245

(22) Filed: Mar. 27, 2015

(65) Prior Publication Data
US 2016/0283853 A1    Sep. 29, 2016

(51) Int. Cl.
*G06N 7/00*    (2006.01)
*G06F 9/46*    (2006.01)

(52) U.S. Cl.
CPC ............ *G06N 7/005* (2013.01); *G06F 9/466* (2013.01)

(58) Field of Classification Search
CPC ...... G06N 99/005; G06N 7/005; G06N 5/047; G06F 17/30516; G06F 11/3476
See application file for complete search history.

(56) References Cited

U.S. PATENT DOCUMENTS

| 8,589,436 | B2 | 11/2013 | Srinivasan et al. | |
|---|---|---|---|---|
| 2010/0223499 | A1* | 9/2010 | Panigrahy | G06F 11/0709 714/19 |
| 2013/0132008 | A1* | 5/2013 | Borean | G01D 4/00 702/60 |
| 2014/0063237 | A1 | 3/2014 | Stone et al. | |
| 2014/0095536 | A1* | 4/2014 | Raichelgauz | H04H 60/37 707/769 |
| 2014/0219101 | A1* | 8/2014 | Horovitz | H04L 47/2483 370/236 |

(Continued)

FOREIGN PATENT DOCUMENTS

| CN | 103049656 A | 4/2013 |
|---|---|---|
| CN | 103577307 A | 2/2014 |

(Continued)

OTHER PUBLICATIONS

Rodgers, Peter. "A survey of Euler diagrams." Journal of Visual Languages & Computing 25.3 (2014): 134-155.*

(Continued)

*Primary Examiner* — Scott A. Waldron
*Assistant Examiner* — Kevin W Figueroa
(74) *Attorney, Agent, or Firm* — Christopher K. McLane; Daniel R. Simek (57) ABSTRACT

The method includes identifying a log stream from a first device, wherein the first device is of an unknown device type. The method further includes identifying features in the log stream from the first device. The method further includes determining a probability that the log stream from the first device was created by a specific device type based on matching of features of the identified log stream from the first device and features in log streams from a plurality of known device types.

20 Claims, 9 Drawing Sheets

(56) References Cited

U.S. PATENT DOCUMENTS

| 2014/0323057 | A1 | 10/2014 | Carbajal | |
|---|---|---|---|---|
| 2015/0142707 | A1* | 5/2015 | Charif | G06N 99/005 |
| | | | | 706/12 |
| 2016/0155128 | A1* | 6/2016 | Desai | G06Q 20/4016 |
| | | | | 705/44 |

FOREIGN PATENT DOCUMENTS

| CN | 103761296 A | 4/2014 |
|---|---|---|
| CN | 104065644 A | 9/2014 |
| CN | 104144071 A | 11/2014 |
| CN | 104461842 A | 3/2015 |
| CN | 106022349 A | 10/2016 |
| DE | 102016205013 A1 | 9/2016 |
| WO | 2014117406 A1 | 8/2014 |

OTHER PUBLICATIONS

List of IBM Patents or Patent Applications Treated as Related, May 28, 2015.

Tien Hiong Lee, et al., "Fingerprinting and Matching Log Streams", U.S. Appl. No. 14/728,071 filed Jun. 2, 2015.

Mala, et al., "Data Stream Mining Algorithms—A Review of Issues and Existing Approaches", International Journal on Computer Science and Engineering (IJCSE), ISSN: 0975-3397, vol. 3, No. 7, Jul. 2011, pp. 2726-2732, <http://www.enggjournals.com/ijcse/doc/IJCSE11-03-07-064.pdf>.

* cited by examiner

Raw Device Log L1

2014-07-31 00:15:00,462 DEBUG Device.WindowsDHCP.WindowsDHCPDeviceReader.FDSNL : Ignoring file that wasn't active today: \\fdsnl.pc.factset.com\dhcp$\DhcpV6SrvLog-Thu.log
2014-07-31 00:15:00,493 DEBUG Device.WindowsDHCP.WindowsDHCPDeviceReader.FDSNL : Ignoring file that wasn't active today: \\fdsnl.pc.factset.com\dhcp$\DhcpV6SrvLog-Tue.log
2014-07-31 00:15:00,509 DEBUG Device.WindowsDHCP.WindowsDHCPDeviceReader.FDSNL : Ignoring file that wasn't active today: \\fdsnl.pc.factset.com\dhcp$\DhcpV6SrvLog-Wed.log
2014-07-31 00:15:00,540 INFO Device.WindowsDHCP.WindowsDHCPDeviceReader.FDSNL : Removing a file from monitoring: \\fdsnl.pc.factset.com\dhcp$\DhcpSrvLog-Thu.log
2014-07-31 00:15:00,555 INFO Device.WindowsDHCP.WindowsDHCPDeviceReader.FDSNL : Removing a file from monitoring: \\fdsnl.pc.factset.com\dhcp$\dhcpv6srvlog-thu.log
2014-07-31 00:15:00,587 DEBUG Device.WindowsDHCP.WindowsDHCPDeviceReader.FDSNL : Re-enabling file system redirection for current thread.
2014-07-31 00:15:00,602 DEBUG Device.WindowsDHCP.WindowsDHCPDeviceReader.FDSNL : Detected a <modification> directory change!!!! \\fdsnl.pc.factset.com\dhcp$
2014-07-31 01:15:08,953 DEBUG Device.WindowsDHCP.WindowsDHCPDeviceReader.FDSNL : Temporarily turning off file system redirection for current thread....
2014-07-31 01:15:08,968 DEBUG Device.WindowsDHCP.WindowsDHCPDeviceReader.FDSNL : Ignoring file that wasn't active today: \\fdsnl.pc.factset.com\dhcp$\DhcpSrvLog-Fri.log
2014-07-31 01:15:08,984 DEBUG Device.WindowsDHCP.WindowsDHCPDeviceReader.FDSNL : Ignoring file that wasn't active today: \\fdsnl.pc.factset.com\dhcp$\DhcpSrvLog-Mon.log
2014-07-31 01:15:09,015 DEBUG Device.WindowsDHCP.WindowsDHCPDeviceReader.FDSNL : Ignoring file that wasn't active today: \\fdsnl.pc.factset.com\dhcp$\DhcpSrvLog-Sat.log
2014-07-31 01:15:09,031 DEBUG Device.WindowsDHCP.WindowsDHCPDeviceReader.FDSNL : Ignoring file that wasn't active today: \\fdsnl.pc.factset.com\dhcp$\DhcpSrvLog-Sun.log
2014-07-31 01:15:09,062 DEBUG Device.WindowsDHCP.WindowsDHCPDeviceReader.FDSNL : Ignoring file that wasn't active today: \\fdsnl.pc.factset.com\dhcp$\DhcpSrvLog-Thu.log
2014-07-31 01:15:09,078 DEBUG Device.WindowsDHCP.WindowsDHCPDeviceReader.FDSNL : Ignoring file that wasn't active today: \\fdsnl.pc.factset.com\dhcp$\DhcpSrvLog-Tue.log

FIG. 4

Tokenized Device Log, L1

[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpV0SrvLog-Thu] [log]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpV0SrvLog-Tue] [log]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpV0SrvLog-Wed] [log]
[0-0-0] [INFO] [Device] [WindowsDHCP] [WindowsDHCPDeviceReader] [FDSNL] [Removing] [a] [file] [from] [monitoring] [fdsnl] [pc] [factset] [com] [dhcp] [DhcpSrvLog-Thu] [log]
[0-0-0] [INFO] [Device] [WindowsDHCP] [WindowsDHCPDeviceReader] [FDSNL] [Removing] [a] [file] [from] [monitoring] [fdsnl] [pc] [factset] [com] [dhcp] [dhcpv0srvlog-thu] [log]
[0-0-0] [DEBUG] [Device] [WindowsDHCP] [WindowsDHCPDeviceReader] [FDSNL] [Re-enabling] [file] [system] [redirection] [for] [current] [thread]
[0-0-0] [DEBUG] [Device] [WindowsDHCP] [WindowsDHCPDeviceReader] [FDSNL] [Detected] [a] [modification] [directory] [change] [fdsnl] [pc] [factset] [com] [dhcp]
[0-0-0] [DEBUG] [Device] [WindowsDHCP] [WindowsDHCPDeviceReader] [FDSNL] [Temporarily] [turning] [off] [file] [system] [redirection] [for] [current] [thread]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Fri]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Mon]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Sat]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Sun]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Thu]
[0-0-0] [DEBUG] [Device] [WindowsDHCP] [WindowsDHCPDeviceReader] [FDSNL] [Ignoring] [file] [that] [wasn] [t] [active] [today] [fdsnl] [pc] [factset] [com] [dhcp] [DhcpSrvLog-Tue]

FIG. 5

| Fi | Characteristics of Log Stream L1 |
|---|---|
| F1 | [0-0-0] |
| F2 | [DEBUG] |
| F3 | [Device] |
| F4 | [WindowsDHCP] |
| F5 | [WindowsDHCPDeviceReader] |
| F6 | {2} [DEBUG] |
| F7 | {3} [Device] |
| F8 | [Device] {=>} [WindowsDHCP] |
| F9 | [Device] {==>} [WindowsDHCPDeviceReader] |
| F10 | [Ignoring] |
| F11 | [file] |
| F12 | [Ignoring] {=>} [file] |
| F13 | [that] |
| F14 | [wasn] [t] |
| F15 | [active] |
| F16 | [wasn] [t] {=>} [active] |
| F17 | [today] |

FIG. 6

Initial fingerprint map matrix
146

|    | F1 | F2 | F3 | F4 | F5 | F6 | ... | Fi | ... | Fn |
|----|----|----|----|----|----|----|-----|----|-----|----|
| L1 | 1  | 0  | 0  | 1  | 1  | 1  |     | 0  |     | 0  |
| L2 | 0  | 1  | 0  | 0  | 1  | 1  |     | 1  |     | 1  |
| L3 | 0  | 0  | 0  | 0  | 0  | 1  |     | 1  |     | 0  |
| L4 | 0  | 0  | 0  | 1  | 1  | 1  |     | 0  |     | 1  |
| L5 | 0  | 1  | 0  | 1  | 1  | 1  |     | 1  |     | 1  |
| ...| 1  | 1  | 1  | 1  | 1  | 1  |     | 0  |     | 1  |
| ...| 1  | 1  | 1  | 0  | 0  | 0  |     | 1  |     | 0  |
| Lm | 1  | 1  | 1  | 0  | 0  | 0  |     | 1  |     | 1  |

FIG. 7

$$Fmap = \begin{bmatrix} wf_1 \\ wf_2 \\ wf_3 \\ wf_4 \\ wf_5 \\ wf_6 \\ wf_i \\ wf_{n-1} \\ wf_n \end{bmatrix}$$

FIG. 8

Normalized fingerprint map matrix
148

$$Fmap = \begin{bmatrix} wf_1 & 0 & 0 & wf_4 & wf_5 & wf_6 & wf_i & wf_{n-1} & 0 \\ 0 & wf_2 & 0 & 0 & wf_5 & wf_6 & 0 & wf_{n-1} & wf_n \\ 0 & 0 & 0 & 0 & 0 & wf_6 & wf_i & 0 & 0 \\ 0 & 0 & 0 & wf_4 & wf_5 & wf_6 & 0 & wf_{n-1} & wf_n \\ 0 & wf_2 & 0 & wf_4 & wf_5 & wf_6 & wf_i & wf_{n-1} & wf_n \\ wf_1 & wf_2 & 0 & wf_4 & wf_5 & 0 & 0 & wf_{n-1} & wf_n \\ wf_1 & wf_2 & 0 & 0 & 0 & 0 & wf_i & 0 & wf_n \\ wf_1 & wf_2 & 0 & 0 & 0 & 0 & wf_i & wf_{n-1} & wf_n \end{bmatrix}$$

FIG. 9

$$P(S_{Device1}) = \frac{\sum_{i=1}^{ii} wf_i}{n}$$

FIG. 10

$$P(S_{Device2}) = \frac{\sum_{i=1}^{ii} wf_i}{n} = \frac{wf_2 + wf_5 + wf_6 + wf_i + wf_{n-1} + wf_n}{n}$$

FINGERPRINTING AND MATCHING LOG STREAMS

BACKGROUND OF THE INVENTION

The present invention relates generally to log streams, and more particularly to determining a device type based on the log stream.

In computing, a logfile is a file that records either events that occur in an operating system or other software runs or messages between different users of a communication software. Logging is the act of keeping a log. In the simplest case, messages are written to a single logfile by a computing device.

Event logs record events taking place in the execution of a system in order to provide an audit trail that can be used to understand the activity of the system and to diagnose problems. Event logs are essential to understand the activities of complex systems, particularly in the case of applications with little user interaction, such as a server application.

Most database systems maintain some kind of transaction log, which are not mainly intended as an audit trail for later analysis and are not intended to be human-readable. The transaction logs record changes to stored data to allow the database to recover from crashes or other data errors and maintain the stored data in a consistent state. Thus, database systems usually have both general event logs and transaction logs.

It is known to perform regular expression-based pattern matching in data streams by U.S. Pat. No. 8,589,436 B2 by Srinivasan et al., which teaches techniques for detecting patterns in one or more data streams. A pattern to be detected may be specified using a regular expression. Events received in a data stream are processed during runtime to detect occurrences of the specified pattern in the data stream.

SUMMARY

Embodiments of the present invention disclose a method for device type determination. In one embodiment, in accordance with the present invention, the computer-implemented method includes identifying, by one or more computer processors, a log stream from a first device, wherein the first device is of an unknown device type. The method further includes identifying, by one or more computer processors, features in the log stream from the first device. The method further includes determining, by one or more computer processors, a probability that the log stream from the first device was created by a specific device type based on matching of features of the identified log stream from the first device and features in log streams from a plurality of known device types.

In another embodiment, a computer program product includes program instructions to identify a log stream from a first device, wherein the first device is of an unknown device type. The computer program product includes program instructions to identify features in the log stream from the first device. The computer program product includes program instructions to determine a probability that the log stream from the first device was created by a specific device type based on matching of features of the identified log stream from the first device and features in log streams from a plurality of known device types.

In another embodiment, a computer system includes program instructions to identify a log stream from a first device, wherein the first device is of an unknown device type. The computer system includes program instructions to identify features in the log stream from the first device. The computer system includes program instructions to determine a probability that the log stream from the first device was created by a specific device type based on matching of features of the identified log stream from the first device and features in log streams from a plurality of known device types.

In yet another embodiment, the method includes identifying, by one or more computer processors, one or more log streams from devices of known device types. The method includes identifying, by one or more computer processors, one or more features in the one or more log streams from devices of known device types. The method includes generating, by one or more computer processors, a matrix for determining the probability a log stream from an unknown device type corresponds to a log stream from a known device type based on one or more features in the one or more log streams from the known device types.

In yet another embodiment, wherein determining a probability that the log stream from the first device was created by a specific device type, the method includes determining, by one or more computer processors, the probability that the log stream from the first device was created by a specific device type is based on the generated matrix of weighted log stream features.

In yet another embodiments, wherein identifying features in the log stream from the first device the method includes identifying, by one or more computer processors, one or more elements in the log stream, wherein the one or more elements include functional parts of the log stream. The method includes identifying, by one or more computer processors, at least one of: one or more variables in the log stream, a position of elements in the log stream, a distance between elements in the log stream, and a pattern of features in the log stream.

In yet another embodiment, wherein generating a matrix further the method includes weighing, by one or more computer processors, one or more identified features in the log stream from an unknown client device type based on a commonality of identified features in the log stream from an unknown client device type and one or more features of the one or more log streams from the known client device types. The method further includes generating, by one or more computer processors, a matrix comprising one or more weighted features of log streams from known device types and one or more weighted features of a log stream from a first device type.

BRIEF DESCRIPTION OF THE DRAWINGS

FIG. 4 depicts a generic device log, in accordance with an embodiment of the present invention;

FIG. 5 depicts a generic device log that has been tokenized, in accordance with an embodiment of the present invention;

DETAILED DESCRIPTION

Embodiments of the present invention recognize that it may be desirable to determine the type of device that is creating a log stream. Once a device type is determined from a log stream, further tests can be run to determine an actual device that created the log stream. Embodiments of the present invention recognize that the use of parsers for identification of log streams requires a large amount of resources as the amount of log streams increase.

Implementation of embodiments of the invention may take a variety of forms, and exemplary implementation details are discussed subsequently with reference to the Figures.

Figure 1:
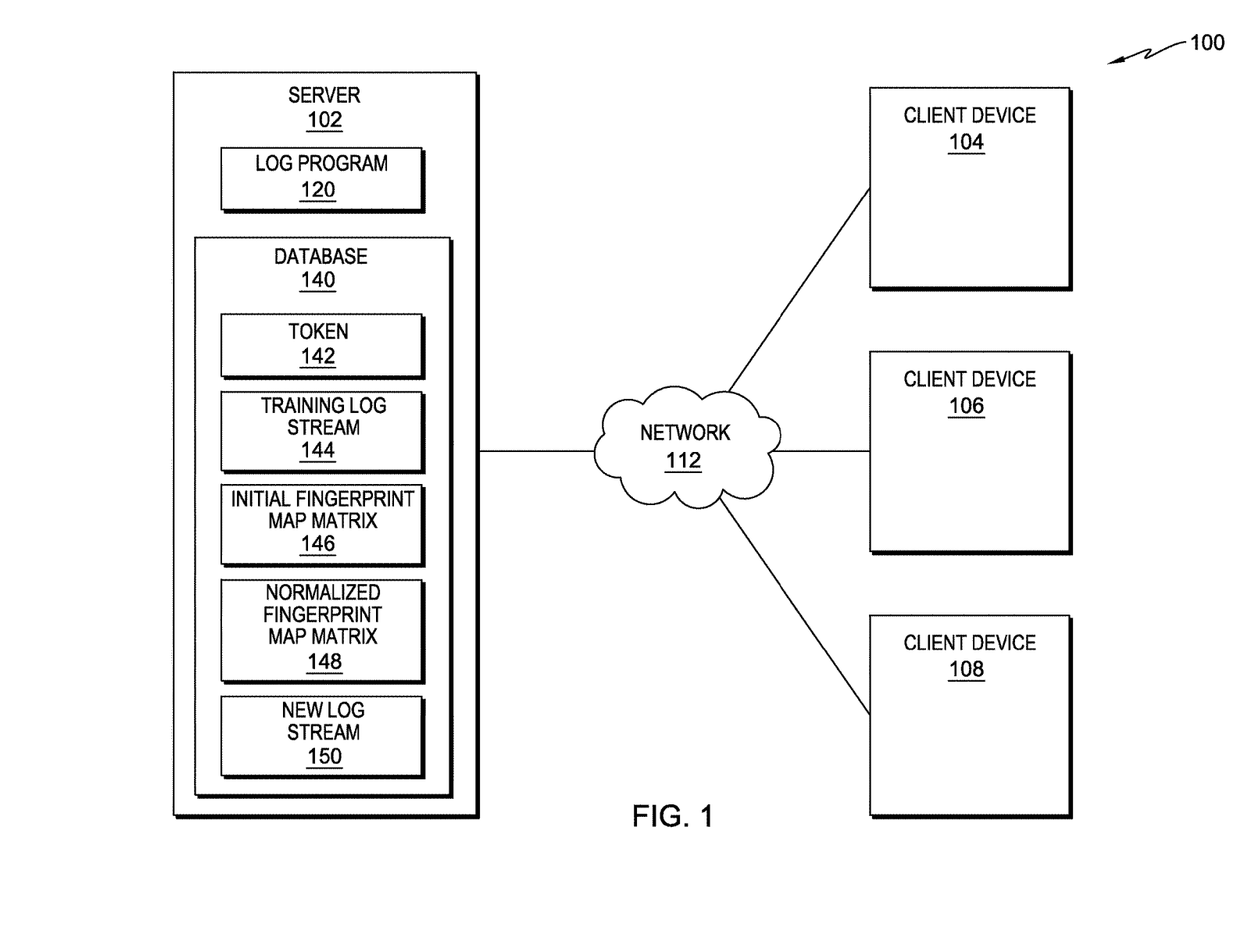
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102 and client devices 104, 106, and 108, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 receives a log stream and determines the probability of a device type that is creating the log stream. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with a client device via network 112. In another embodiment, server 102 represents a computing system utilizing clustered computers and components to act as a single pool of seamless resources. Server 102 may include components as depicted and described in further detail with respect to FIG. 14, in accordance with embodiments of the present invention. Server 102 includes log program 120 and database 140.

In depicted distributed data processing environment 100, log program 120 resides on server 102 and determines the probability of a device type based upon a received log stream. In various embodiments, log program 120 receives information from a client device (e.g., client device 104) containing a log stream, and log program 120 determines probabilities of a device type for the client device that created the log stream. In one example, log program 120 may determine that characteristics in a received log stream create a high probability that the log stream originated from a mobile phone. In another example, log program 120 may determine a probability that a log stream originated from a specific type of device by displaying probabilities for multiple device types (e.g., mobile phone, laptop, tablet, desktop, etc.) In some embodiments, log program 120 may determine probabilities for device types based on real time log streams or stored log streams. Log program 120 is depicted and described in further detail with respect to FIGS. 2 and 3.

In the depicted embodiment, database 140 resides on server 102. In another embodiment, database 140 may reside elsewhere in distributed data processing environment 100, such as within server 102, client devices 104, 106, 108, or independently as a standalone database that is capable of communicating with server 102 and/or client devices 104, 106, and 108 via network 112. A database is an organized collection of data. Database 140 is implemented with any type of storage device capable of storing data that is accessed and utilized by server 102 and client devices 104, 106, and 108, such as a database server, a hard disk drive, or a flash memory. In other embodiments, database 140 represents multiple storage devices within server 102. Database 140 stores information, such as training logs, log streams, predefined tokens, log characteristics, initial fingerprint map matrix, normalized fingerprint map matrix, device type fingerprints, etc. Database 140 includes token 142, training log stream 144, initial fingerprint map matrix 146, normalized fingerprint map matrix 148, and new log stream 150.

In depicted distributed data processing environment 100, token 142 resides on database 140 and is a token term that correlates to an element, string, or numeric value of a log stream. In various embodiments, tokens may be preset by administrators of log program 120 that replace elements in a log stream. Training log stream 144 also resides on database 140 and is a log stream that log program 120 utilizes to create fingerprints for device types. Initial fingerprint map matrix 146 resides on database 140 and is used to input log stream fingerprints. Normalized fingerprint map matrix 148 is located on database 140 and is a fingerprint map matrix that log program 120 has already input all the fingerprint information into the matrix.

In the depicted embodiment, client devices 104, 106, and 108 are one or more of a desktop computer, a laptop computer, a tablet computer, a specialized computer server, a smart phone, or any programmable electronic device capable of communicating with server 102 via network 112 and with various components and devices within distributed data processing environment 100. In general, client devices 104, 106, and 108 represent any programmable electronic device or combination of programmable electronic devices capable of executing machine readable program instructions and communicating with other computing devices via a network, such as network 112. Client devices 104, 106, and 108 may include components as depicted and described in further detail with respect to FIG. 14, in accordance with embodiments of the present invention. In an embodiment, client device 104 sends a log stream via network 112 to server 102 and/or log program 120.

Figure 2:
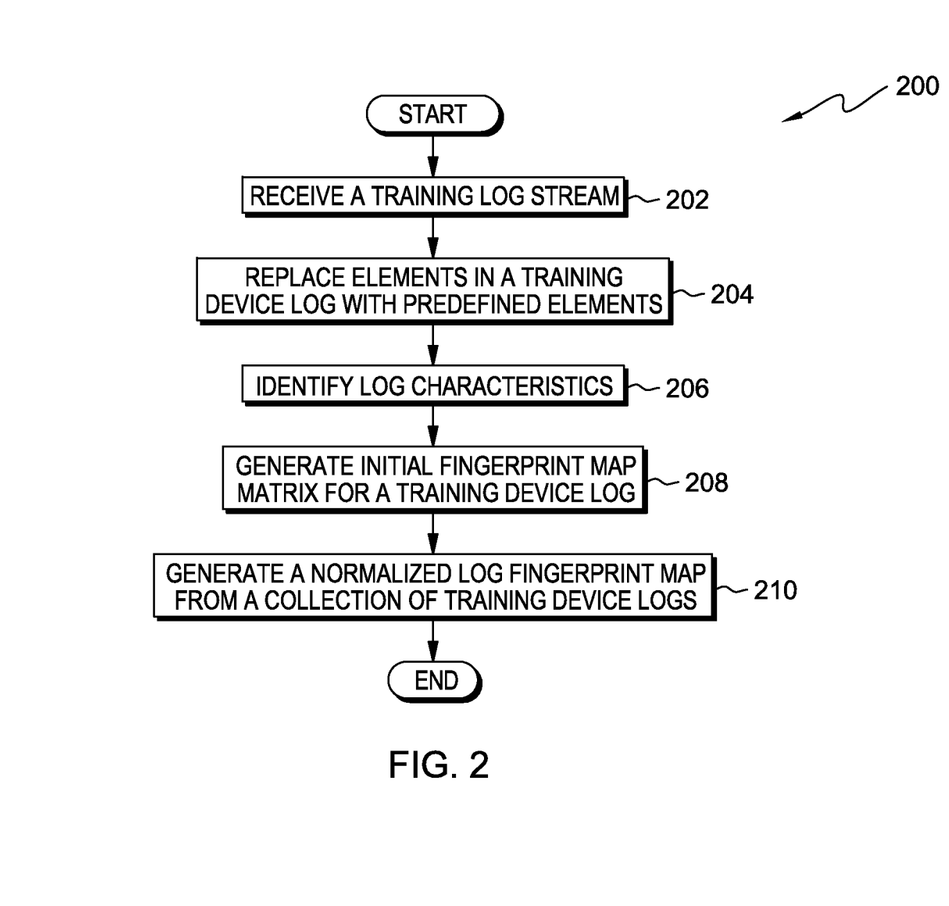
FIG. 2 is a flowchart depicting operational steps of a program for generating a log fingerprint map database within the distributed data processing environment of FIG. 1, in accordance with an embodiment of the present invention.

FIG. 2 is a flowchart depicting operational steps of program 200, which is a function of log program 120, in accordance with an embodiment of the present invention. Program 200 operates on server 102 and generates a log fingerprint map database. In various embodiments, administrators of log program 120 may add training logs to a database to improve or create a fingerprint map, such as normalized fingerprint map matrix 148. In some embodiments, program 200 may begin the operational steps of FIG. 2 after a new training log has been added to a database. In some embodiments, the operational steps of FIG. 2 may begin after program 300 finds a low probability of a match (e.g., 1%) for a log stream. In an embodiment, program 200 may begin the operational steps of FIG. 2 at preset times.

Program 200 receives a training log stream (step 202). In various embodiments, program 200 may receive a training log stream from an administrator of log program 120. In one example, an administrator of log program 120 inputs a training log stream (e.g., training log stream 144) into program 200. In another example, an administrator of log program 120 inputs a training log stream into a database (e.g., database 140). In some embodiments, program 200 may receive a training log stream from a client device, such as client device 104. In yet other embodiments, program 200 may receive a training log stream from program 300 after program 300 has determined that the probability for a match of a log stream to a known type of device is low.

Program 200 replaces elements in the training device log with predefined elements (step 204). Program 200 replaces elements in a training log stream (e.g., training log stream 144) with predefined elements, also known as tokens (e.g., token 142), that correlate to the original elements in the training log stream. Each token represents a string, numeric value, and/or element of the training device log. FIG. 4 depicts a log stream that has not had tokens replace elements within the device log. FIG. 5 depicts the same log stream after program 200 replaces the elements in the training device log with predefined elements also known as tokens. Replacing elements in a log stream with predefined elements is known as tokenizing a log stream. In various embodiments, the tokens are preset by administrators to correlate to specific elements, numeric values, and/or strings.

In some embodiments, log streams may contain a significant amount of computer names, timestamps, codes etc. that are not known in advance. A natural language processor may not be able to discern certain symbols. Program 200 replaces the elements with tokens which are easily understandable. In an example, each line is a separate independent event in the stream. At the start of a line in the stream, program 200 generates [start_line] token and at the end—[end_line]. Then, program 200 splits the line at spaces and punctuation marks and generates corresponding tokens for each part in sequence. Any part of the string that would correspond to a constant in string's code is very useful for detection because the string is the output of a program. Program 200 generates tokens from symbols like '{', '[', ':', and the combinations of the symbols. In some embodiments, program 200 changes parts of the log stream, such as Internet protocol (IP) addresses and timestamps. In an example, program 200 generates a special token for a number encountered at a specific position (e.g., [number] token), as numbers are unlikely to match each other in later steps. Similarly, instead of an IP address in the stream, program 200 generates [ip_address] token, as well as [month] token. Replacing elements with tokens is advantageous because it allows for the generation of similar features.

Figure 6:
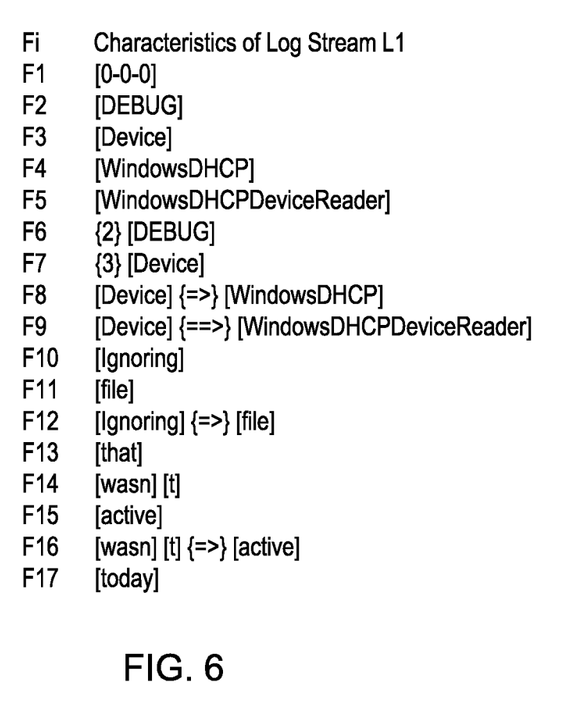
FIG. 6 depicts characteristics from a tokenized device log, in accordance with an embodiment of the present invention.

Program 200 identifies log characteristics (step 206). In some embodiments, program 200 identifies log characteristics from the tokenized log stream (e.g., training log stream 144 after training log stream 144 has been tokenized). In an example, program 200 identifies token positions, relationship of tokens to one another, the number of tokens, the type of tokens, etc. FIG. 6 is an example of characteristics that program 200 identifies from the first line of the tokenized log stream in FIG. 5. In some embodiments, program 200 may identify tokenized characteristics, such as date, time, pair, positional data, IP address, port number, etc. In an example, an algorithm for program 200 may identify variables, such as dates and time, tokens, token position, relative distance between tokens, etc. In various embodiments, program 200 repeats the process for identifying variables for each line in a log stream to create a chart, such as FIG. 6 for each line of the log stream. In additional embodiments, program 200 repeats step 206 for all device logs. Identifying log characteristics is advantageous because the characteristics can be utilized to create a fingerprint matrix.

Program 200 generates an initial fingerprint map matrix for training device logs (step 208). In various embodiments, program 200 generates a fingerprint map matrix for training device logs for each training device log that comes from a known device. For example, ten training device logs are known to come from a specific device. Program 200 generates a fingerprint map matrix for each known device. In some embodiments, program 200 extracts log characteristics (e.g., features F1, F2, F3, . . . , Fn for all known devices (e.g., D1, D2, D3, . . . , Dm) and the corresponding logs for each device (e.g., L1, L2, L3, . . . , Lm) that are compiled in a fingerprint map matrix of the dimensions m by n (e.g., FIG. 7).

Program 200 generates a normalized log fingerprint map from a collection of training device logs (step 210). In various embodiments, program 200 generates a normalized log fingerprint map based upon the initial fingerprint map matrix. In some embodiments, program 200 removes log characteristics that are common to all devices in the initial fingerprint map matrix. In an example, program 200 removes a characteristic from an initial fingerprint map matrix (e.g., initial fingerprint map matrix 146 depicted in FIG. 7). In this example, the value for F3 is 1, which is the same for all log streams L1 through Lm.

Figure 8:
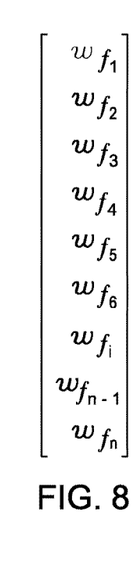
FIG. 8 depicts an exemplary log feature weight vector, in accordance with an embodiment of the present invention.
Figure 9:
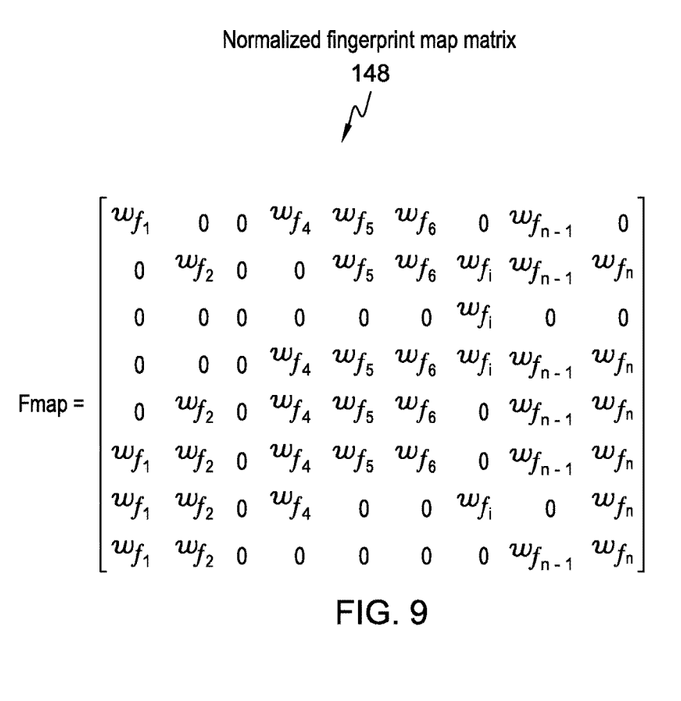
FIG. 9 depicts a normalized fingerprint map matrix generated from characteristics of tokenized device logs, in accordance with an embodiment of the present invention.

In some embodiments, program 200 may assign weighted values to log characteristics. In an example, program 200 assigns higher weighted values to characteristics that are indicative of a type of device, while assigning lower weighted values for characteristics that are common to multiple device types. In another example, token pairs, such as [Device]{=>}[WindowsDHCP] have an associated higher weighted value relative to a single token, such as [WindowsDHCPDeviceReader]. In another example, program 200 weighs common token pairs (e.g., the user) lower than rarer token pairs (e.g., trojan detected). FIG. 8 is an example of the log characteristic weight vector in which $0 \leq Wfi \leq 1$. In various embodiments, program 200 multiplies each log stream (e.g., initial fingerprint map matrix 146 log streams L1 through Lm) by weighted values for characteristics. In one example, an initial fingerprint map matrix that has log streams multiplied by weighted values for characteristics is depicted in FIG. 9. Generating a normalized log fingerprint map is advantageous because it provides a basis for comparison against features of an unknown log stream.

Figure 3:
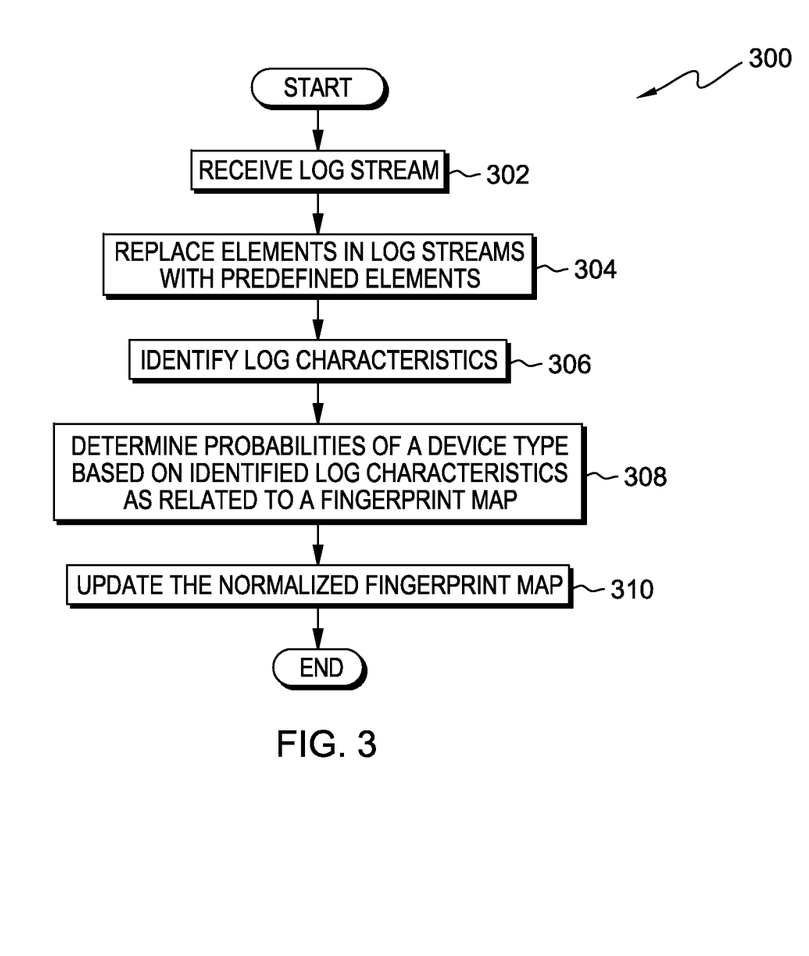
FIG. 3 is a flowchart depicting operational steps of a program for determining a device type based on a log stream within the distributed data processing environment of FIG. 1, in accordance with an embodiment of the present invention.

FIG. 3 is a flowchart depicting operational steps of program 300, which is a function of log program 120, in accordance with an embodiment of the present invention. Program 300 operates on server 102 and determines probabilities of a device type based on a log stream. In various embodiments, the operational steps of program 300 may begin after a new log stream (e.g., new log stream 150) is received by log program 120. In other embodiments, the operational steps of program 300 may begin when an administrator of log program 120 prompts log program 120 to determine the device type for new log streams that are stored in a database (e.g., new log stream 150 stored in database 140). In yet other embodiments, the operational steps of program 300 may begin after a preset time that triggers program 300 to determine the probability for each device type which created a log stream.

Program 300 receives a log stream (step 302). In various embodiments, program 300 receives a log stream(s) from a client device which is connected to a server (e.g., sever 102) via a network (e.g., network 112). In some embodiments, log streams may be stored in a database (e.g., database 140), and program 300 may identify log streams (e.g., new log stream 150). In an example, a program (not depicted) may store log streams for client devices that are connected to a server (e.g., server 102) in a database (e.g., database 140), and program 300 identifies new log streams (e.g., new log stream 150) that have not been processed by program 300.

Program 300 replaces elements in log streams with predefined elements (step 304). Program 300 replaces elements in a log stream (e.g., new log stream 150) with predefined elements, also known as tokens (e.g., token 142), that correlate to the original elements in the log stream. Each token represents a string, numeric value, or element of the log stream. FIG. 4 depicts a log stream that has not had tokens replace elements within the device log. FIG. 5 depicts the same log stream after program 300 replaces the elements in the log stream with predefined elements also known as tokens. Replacing elements in a log stream with predefined elements is known as tokenizing a log stream. In various embodiments, the tokens are preset by administrators to correlate to specific elements, numeric values, or strings.

In some embodiments, log streams may contain a significant amount of computer names, timestamps, codes etc. that are not known in advance. A natural language processor may not be able to discern certain symbols. Program 300 replaces the elements with tokens which are easily understandable. In an example, each line is a separate independent event in the stream. At the start of a line in the stream, program 300 generates [start_line] token and at the end—[end_line]. Then, program 300 would split the line at spaces and punctuation marks, generating corresponding tokens for each part in sequence. Any part of the string that would correspond to a constant in string's code is very useful for detection because the string is the output of a program. Program 300 generates tokens from symbols like '{', '[', ':', and the combinations, which is advantageous. In some embodiments, program 300 changes parts of the log stream, such as Internet protocol (IP) addresses and timestamps. In an example, program 300 generates a special token for a number encountered at a specific position: [number] token, as numbers are unlikely to match each other in later steps. Similarly, instead of an IP address in the stream, program 300 generates [ip_address] token, as well as [month] token.

Program 300 identifies log characteristics (step 306). In some embodiments, program 300 identifies log stream characteristics from the tokenized log stream (e.g., new log stream 150 after new log stream 150 has been tokenized). In an example, program 300 identifies token positions, relationship of tokens to one another, the number of tokens, the type of tokens, etc. FIG. 6 is an example of characteristics that program 300 identifies from the first line of the tokenized log stream in FIG. 5. In some embodiments, program 300 may identify tokenized characteristics, such as date, time, pair, positional data, IP address, port number, etc. In an example, an algorithm for program 300 may identify variables, such as dates and time, tokens, token position, relative distance between tokens, etc. In various embodiments, program 300 repeats the process of identifying variables for each line in a log stream to create a chart, such as FIG. 6 for each line of the log stream. In additional embodiments, program 300 repeats step 306 for all log streams.

Program 300 determines probabilities of a device type based on identified log characteristics as related to a fingerprint map (step 308). In various embodiments, program 300 determines probabilities (e.g., 100%, 90%, 5%, etc.) of a device type (e.g., mobile phone, laptop, desktop, etc.). In some embodiments, program 300 determines probabilities of a device type based on log stream characteristics as the log stream characteristics are compared to a normalized fingerprint map matrix (e.g., normalized fingerprint map matrix 148).

Figure 10:
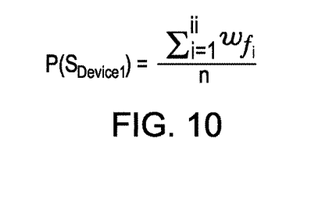
FIG. 10 depicts an exemplary equation for determining the probability of a device type utilizing log vector weight vectors, in accordance with an embodiment of the present invention.
Figure 11:
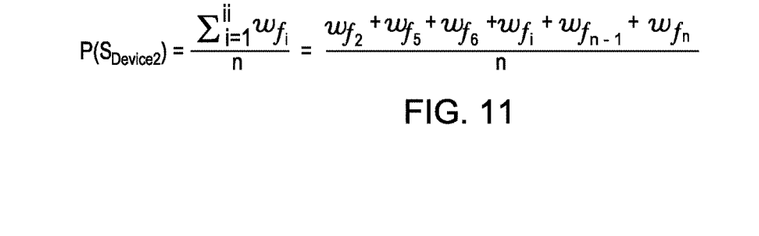
FIG. 11 depicts an exemplary applied version of an equation for determining the probability of a device type utilizing log feature weight vectors, in accordance with an embodiment of the present invention.

In an example, program 300 determines the total number of characteristics that match and do not match for received log stream (e.g., Stream 1/S1, Stream 2/S2, Stream 3/S3, Stream 4/S4, Stream 5/S5, Stream 6/S6 from FIG. 11). In this example, Sdevice_i denotes a device stream that has yet to be detected. Sdevice_i can correlate to S1, S2, S3, etc. Program 300 determines the probability for Sdevice_i utilizing a normalized fingerprint map matrix (e.g., normalized fingerprint map matrix 148, Fmap depicted in FIG. 9). Program 300 determines the conditional probability of log stream S1, given log stream Sdevice_i, where i is equal to 1, 2, 3, . . . , m. The conditional probability can be described as $P(S1|Sdevice\_i)=P(S1 \cap Sdevice\_i)/P(Sdevice\_i)$. For program 300 to determine the number of feature hits favorable to both S1 and Sdevice_i (e.g., $PS1 \cap Sdevice\_i$), program 300 can rearrange the equation to read $P(S1 \cap Sdevice\_i)=P(S1|Sdevice\_i) \times P(Sdevice\_i)$. The aforementioned equation can be read as $P(S1 \cap Sdevice\_i)=$ ((number of feature (F) hits in S1)/(total number of feature hits+misses in S1))×((number of feature hits in Sdevice_i)/(total number of feature hits+misses in Sdevice_i)), where P(S1|Sdevice_i) is computed from a log stream feature extraction algorithm. P(Sdevice_i) can be derived from a normalized fingerprint map matrix (e.g., normalized fingerprint map matrix 148 as depicted in FIG. 9). An example of P(Sdevice_i) can be derived by the equation from FIG. 10.

In another example, program 300 computes the probability for a device (e.g., Device 2, not depicted) utilizing row 2 of Fmap in FIG. 9, as depicted in FIG. 11. In various embodiments, program 300 determines the probability a log stream originated from a type of device by utilizing the number of characteristic that are the same, as well as those that are different.

Figure 13:
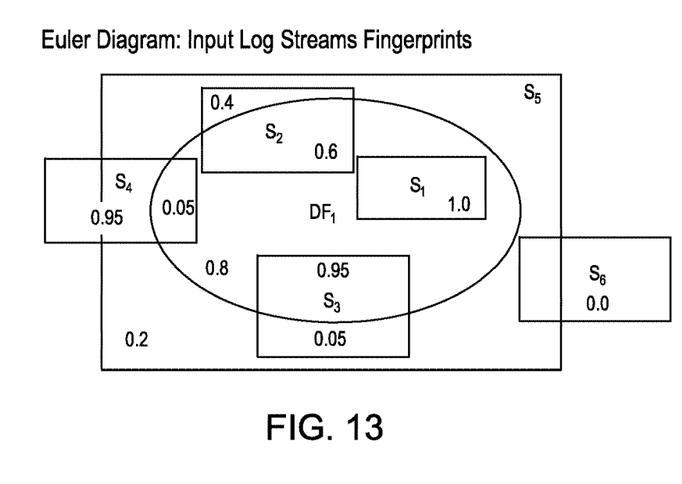
FIG. 13 depicts an Euler Diagram that shows the probability a log stream originated from a particular device, in accordance with embodiments of the present invention.

In another example, program 300 determines probabilities utilizing the Euler diagram from FIG. 13, where log streams S1 through S6 are generated from a device (e.g., Device 1) with a device fingerprint (e.g., DF1) to determine the probabilities. In FIG. 13, stream S1 has a probability of 1, indicating that S1 is from Device 1. S2 has a probability of 0.6, indicating that S2 has a 60% probability of being generated from Device 1. S3 has a probability of 0.95, indicating that S3 has a 95% probability of being generated from Device 1. S4 has a probability of 0.05, indicating that S4 has a 5% probability of being generated from Device 1. S5 has a probability of 0.8, indicating that S5 has a 80% probability of being generated from Device 1. S6 has a probability of 0, indicating that S6 has a 0% probability of being generated from Device 1. Determining probabilities of a device type based on identified log characteristics as related to a fingerprint map is advantageous because it provides for the determination of probabilities of a device type for a large amount of device logs.

In some embodiment, program 300 determines the probability that a device type is a known device type based upon the variations of features in the log streams of known device types as compared to the log stream from an unknown device type in an Euler diagram. For example, one log stream from a first known device type contains certain features. Another log stream from a second known device type contains some of the same features but also some unique features. In this example, program 300 compares the unknown device log stream features to the first and second known device features and determines the probability that the log stream originated from the first or second known devices based on the various features the log streams have in common.

Program 300 updates the normalized fingerprint map (step 310). In various embodiments, program 300 updates the normalized fingerprint map with the new log streams, characteristics, and device types. In an example, program 300 determines that a low probability (e.g., 5%) exists that the log stream was generated by any known device type. In this example, program 300 may send data prompting administrators of log program 120 to determine the type of device that created the low probability log stream. Program 300 may then add the additional information into a database (e.g., database 140) and the normalized fingerprint map matrix (e.g., normalized fingerprint map matrix 148), as to allow future similar log streams to indicate the type of device. In some embodiments, program 300 adds all log streams to the normalized fingerprint map matrix.

FIG. 4 depicts an exemplary log stream, which may have been collected by log program 120. In some embodiments, log program 120 may store log streams, such as raw device log, L1 in database 140. FIG. 4 may also depict one iteration of new log stream 150 or training log stream 144. In an example, FIG. 4 depicts a log stream that may be received in step 202 or 302.

FIG. 5 depicts an exemplary log stream, such as the log stream depicted in FIG. 4, which has been tokenized. In some embodiments, log program 120 may store tokenized log streams in a database, such as database 140. In an example, FIG. 5 depicts a log stream that has been generated in step 204 or 304.

FIG. 6 depicts characteristics from a tokenized log stream, such as the tokenized log stream in FIG. 5. Characteristics from FIG. 5 are depicted and labeled F1-F17. Characteristics are also known as features. In an example, FIG. 6 depicts identified characterizes as in step 206 or 306.

Figure 7:
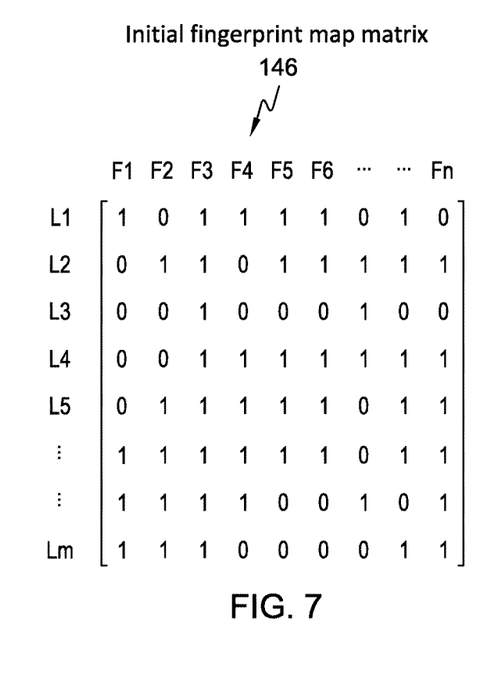
FIG. 7 depicts an initial fingerprint map matrix generated from characteristics of a tokenized device log, in accordance with an embodiment of the present invention.

FIG. 7 depicts an initial fingerprint map matrix generated from characteristics of a tokenized device log. Characteristics can also be referred to as features and/or elements. In an example, FIG. 7 depicts an initial fingerprint map matrix, such as the one generated in step 208.

FIG. 8 depicts an exemplary log feature weight vector. In an example, log program 120 multiplies features of a log stream by a weight vector as part of the determination of the probability that a log stream was created by a specific type of device. In an example, FIG. 8 depicts log feature weight vectors as used in step 210.

FIG. 9 depicts a normalized fingerprint map matrix generated from characteristics of tokenized device logs. In an example, log program 120 creates a normalized fingerprint map matrix, such as the matrix depicted in FIG. 9, after multiplying weight vectors against features of log streams for multiple log streams. In an example, FIG. 9 depicts a normalized fingerprint map matrix, such as one generated in step 210.

FIG. 10 depicts an exemplary equation for determining the probability of a device type utilizing log vector weight vectors. The equation in FIG. 10 illustrates one exemplary way to determine a probability of a type of device that created a log stream. In an example, FIG. 10 depicts an exemplary equation used to determine probability of a device type, such as used in step 308.

FIG. 11 depicts an exemplary applied version of an equation for determining the probability of a device type utilizing log feature weight vectors. FIG. 11 is the equation from FIG. 10 which has the log weight vectors input. In an example, FIG. 11 depicts an exemplary equation used to determine probability of a device type, such as used in step 308.

Figure 12:
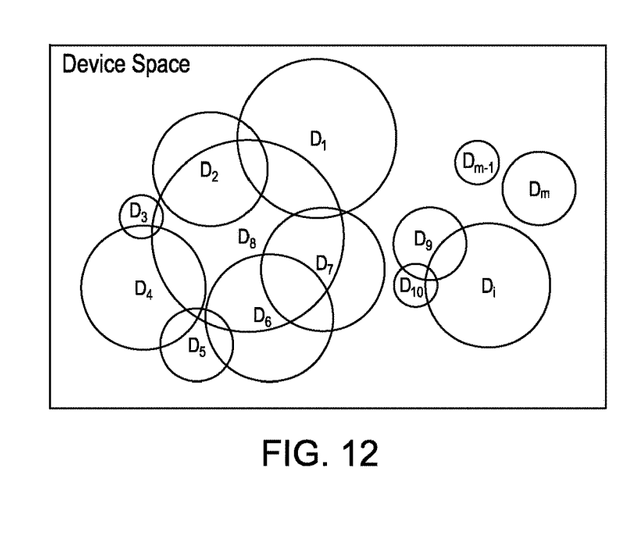
FIG. 12 depicts an exemplary diagram showing the relation of device features to one another, in accordance with an embodiment of the present invention.

FIG. 12 depicts an exemplary diagram showing the relation of device features to one another. The exemplary diagram depicts multiple devices which overlap in features. For example, characteristics of a device belonging to D2 overlap characteristics of a device belong to D1 and D8. FIG. 12 illustrates shared probabilities, for example, a log stream originating from D2 may have a high probability (e.g., 80%) of originating from D8 and higher probability of originating from D2 (e.g., 90%). FIG. 12 depicts a device space including exemplary representations devices based upon data from log streams such as: D1, D2, D3, D4, D5, D6, D7, D8, D9, D10, Di, Dm, and Dm−1. In an example, FIG. 12 depicts a relation of device features as discussed in step 308.

FIG. 13 depicts an Euler Diagram that shows the probability a log stream originated from a particular device. FIG. 13 shows a representation of log streams compared to a singular device type. In an example, FIG. 13 depicts a probability of a log stream originating from a device as discussed in step 308.

Figure 14:
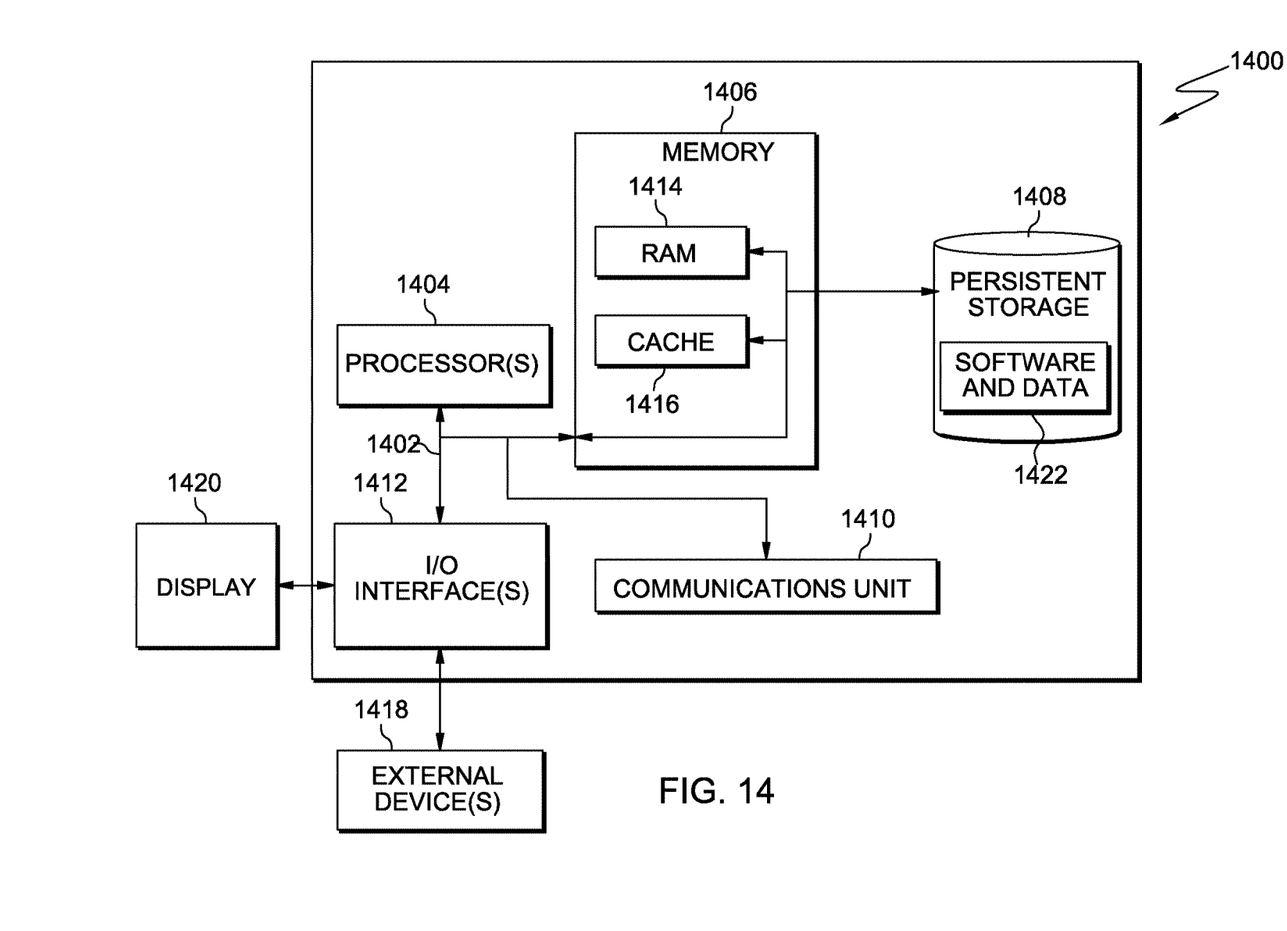
FIG. 14 depicts a block diagram of components of a client device, a server, and a web server of FIG. 1, in accordance with an embodiment of the present invention.

FIG. 14 depicts a block diagram of components of computer 1400, which is representative of server 102 and client devices 104, 106, and 108, in accordance with an illustrative embodiment of the present invention. It should be appreciated that FIG. 14 provides only an illustration of one implementation and does not imply any limitations with regard to the environments in which different embodiments may be implemented. Many modifications to the depicted environment may be made.

Computer 1400 includes communications fabric 1402, which provides communications between computer processor(s) 1404, memory 1406, persistent storage 1408, communications unit 1410, and input/output (I/O) interface(s) 1412. Communications fabric 1402 can be implemented with any architecture designed for passing data and/or control information between processors (such as microprocessors, communications, and network processors, etc.), system memory, peripheral devices, and any other hardware components within a system. For example, communications fabric 1402 can be implemented with one or more buses.

Memory 1406 and persistent storage 1408 are computer readable storage media. In this embodiment, memory 1406 includes random access memory (RAM) 1414 and cache memory 1416. In general, memory 1406 can include any suitable volatile or non-volatile computer readable storage media. Software and data 1422 are stored in persistent storage 1408 for access and/or execution by processor(s) 1404 via one or more memories of memory 1406. With respect to server 102, software and data 1422 represents log program 120 and database 140.

In this embodiment, persistent storage 1408 includes a magnetic hard disk drive. Alternatively, or in addition to a magnetic hard disk drive, persistent storage 1408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer readable storage medium that is also part of persistent storage 1408.

Communications unit 1410, in these examples, provides for communications with other data processing systems or devices. In these examples, communications unit 1410 includes one or more network interface cards. Communications unit 1410 may provide communications through the use of either or both physical and wireless communications links. Software and data 1422 may be downloaded to persistent storage 1408 through communications unit 1410.

I/O interface(s) 1412 allows for input and output of data with other devices that may be connected to computer 1400. For example, I/O interface(s) 1412 may provide a connection to external device(s) 1418, such as a keyboard, a keypad, a touch screen, and/or some other suitable input device. External device(s) 1418 can also include portable computer readable storage media such as, for example, thumb drives, portable optical or magnetic disks, and memory cards. Software and data 1422 can be stored on such portable computer readable storage media and can be loaded onto persistent storage 1408 via I/O interface(s) 1412. I/O interface(s) 1412 also connect to a display 1420.

Display 1420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for device type determination, the computer program product comprising:
one or more computer readable storage media and program instructions stored on the one or more computer readable storage media, the program instructions comprising:
program instructions to identify a log stream, wherein the log stream is a list of operating system events, from a first device, wherein the first device is of an unknown electronic device type;
program instructions to identify features in the log stream from the first device;
program instructions to determine a probability that the log stream from the first device was created by a specific device type based on matching of features of the identified log stream from the first device and features in one or more log streams from a plurality of known device types;
program instructions to identify one or more elements within the one or more log streams from the plurality of known device types;
program instructions to replace each of the identified one or more elements with a token, wherein the token represents one or more of: a string, a numeric value, and an element;
program instructions to identify one or more log characteristics based on the token that replaced each of the identified one or more elements, wherein the one or more log characteristics identify a token position, a relationship between the token and one or more tokens, a number of tokens, and a type of the token;
program instructions to generate a matrix based on the identified one or more log characteristics for each of identified one or more log streams from the plurality of known device types; and
program instructions to determine the specific device type of the first device based in part on the probability.

2. A computer program product of claim 1, further comprising program instructions to:
identify one or more log streams from the plurality of known device types;
identify one or more features in the one or more log streams from the plurality of known device types; and
generate a matrix for determining the probability a log stream from the first device type corresponds to a log stream from a known device type based on the identified one or more features in the one or more log streams from the plurality of known device types.

3. The computer program product of claim 2, wherein program instructions to generating a matrix further comprises program instructions to:
assign weights to the identified features wherein a high weight identifies a specific type of device and a low weight identifies a plurality of device types;
generate the matrix based on the identified features of the one or more log streams from the plurality of known device types;
normalize the generated matrix;

weigh one or more identified features in the log stream from the first device type based on the normalized matrix, wherein the weight of the one or more identified features is based on a commonality of identified features in the log stream from the first device type and the identified one or more features of the one or more log streams from the plurality of known device types; and generate a matrix comprising one or more weighted features of log streams from the plurality of known device types and one or more weighted features of a log stream from a first device type.

4. The computer program product of claim 1, wherein program instructions to determine a probability that the log stream from the first device was created by a specific device type, further comprises program instructions to:

determine the probability that the log stream from the first device was created by a specific device type is based on a generated matrix of one or more weighted log stream features.

5. The computer program product of claim 1, wherein program instructions to identifying features in the log stream from the first device further comprises program instructions to:

identify one or more elements in the log stream, wherein the one or more elements include functional parts of the log stream; and identify one or more variables in the log stream, a position of elements in the log stream, a distance between elements in the log stream, and a pattern of features in the log stream.

6. The computer program product of claim 1, wherein program instructions to determine a probability that the log stream from the first device was created by a specific device type further comprise program instructions to:

identify one or more features of the log stream that vary depending on device type; and generate a Euler diagram based on the identified one or more features of the log stream that vary depending on device type.

7. The computer program product of claim 1, further comprising program instructions to:

identify a plurality of log streams originating from the first device; and determine a probability the plurality of log streams originating from the first device correspond to a known device type.

8. The computer program product of claim 7, wherein program instructions to determine a probability the plurality of log streams originating from the first device corresponds to a known device further comprises program instructions to:

determine a total number of log characteristics of the plurality of log streams originating from the first device that correspond to log characteristics of the plurality of log streams that correspond to a specific known device type;

determine a total number of log characteristics of the plurality of log streams from the first device that do not correspond to the characteristics of the plurality of log streams that correspond to a specific known device type; and determine the probability that the plurality of log streams originating from the first device correspond to the specific known device type based on the determined total number of characteristics of the one or more log streams of the plurality of log streams that correspond to a specific known device type and the determined total number of characteristics of the one or more log streams of the plurality of log streams that do not correspond to the specific known device type.

9. The computer program product of claim 1, wherein the identified features include a computer name, a time stamp, an Internet Protocol Address, one or more spaces, and one or more punctuation.

10. The computer program product of claim 1, further comprising program instructions to:

identify one or more common log characteristics within the identified one or more log characteristics;

update a generated matrix by removing the identified one or more common log characteristics from the generated matrix;

assign a weight to each of the identified one or more log characteristics, wherein the weight is one of: a lower weight is associated with a log characteristic that is common to more than one device type, and a higher weight is associated with a log characteristics for a device type; and generate a normalized matrix by multiplying the updated matrix by the assigned weight.

11. The computer program product of claim 1, wherein the probability is a conditional probability of the received log stream utilizing a generated normalized matrix, wherein the conditional probability is based on a determined total number of log characteristics that match within the generated normalized matrix divided by a sum of the determined total number of log characteristics that match within the generated normalized matrix and a determined total number of log characteristics that do not match within the generated normalized matrix multiplied by a determined total number of log characteristics within a created chart that match divided by a sum of the determined total number of log characteristics that match within the created chart and a determined total number of log characteristics that do not match within the created chart.

12. A computer system for device type determination, the computer system comprising:

one or more computer processors;

one or more computer readable storage media;

program instructions stored on the computer readable storage media for execution by at least one of the one or more computer processors, the program instructions comprising:

program instructions to identify a log stream, wherein the log stream is a list of operating system events, from a first device, wherein the first device is of an unknown electronic device type;

program instructions to identify features in the log stream from the first device;

program instructions to determine a probability that the log stream from the first device was created by a specific device type based on matching of features of the identified log stream from the first device and features in one or more log streams from a plurality of known device types;

program instructions to identify one or more elements within the one or more log streams from the plurality of known device types;

program instructions to replace each of the identified one or more elements with a token, wherein the token represents one or more of: a string, a numeric value, and an element;

program instructions to identify one or more log characteristics based on the token that replaced each of the identified one or more elements, wherein the one or more log characteristics identify a token position, a relationship between the token and one or more tokens, a number of tokens, and a type of the token;

program instructions to generate a matrix based on the identified one or more log characteristics for each of identified one or more log streams from the plurality of known device types; and program instructions to determine the specific device type of the first device based in part on the probability.

13. A computer system of claim 12, further comprising program instructions to:

identify one or more log streams from the plurality of known device types;

identify one or more features in the one or more log streams from the plurality of known device types; and generate a matrix for determining the probability a log stream from the first device type corresponds to a log stream from a known device type based on the identified one or more features in the one or more log streams from the plurality of known device types.

14. The computer system of claim 13, wherein program instructions to generating a matrix further comprises program instructions to:

assign weights to the identified features, wherein a high weight identifies a specific type of device and a low weight identifies a plurality of device types;

generate the matrix based on the identified features of the one or more log streams from the plurality of known device types;

normalize the generated matrix;

weigh one or more identified features in the log stream from the first device type based on the normalized matrix, wherein the weight of the one or more identified features is based on a commonality of identified features in the log stream from the first device type and the identified one or more features of the one or more log streams from the plurality of known device types; and generate a matrix comprising one or more weighted features of log streams from the plurality of known device types and one or more weighted features of a log stream from a first device type.

15. The computer system of claim 12, wherein program instructions to determine a probability that the log stream from the first device was created by a specific device type, further comprises program instructions to:

determine the probability that the log stream from the first device was created by a specific device type is based on a generated matrix of one or more weighted log stream features.

16. The computer system of claim 12, wherein program instructions to identifying features in the log stream from the first device further comprises program instructions to:

identify one or more elements in the log stream, wherein the one or more elements include functional parts of the log stream; and identify one or more variables in the log stream, a position of elements in the log stream, a distance between elements in the log stream, and a pattern of features in the log stream.

17. The computer system of claim 12, wherein program instructions to determine a probability that the log stream from the first device was created by a specific device type further comprise program instructions to:

identify one or more features of the log stream that vary depending on device type; and generate a Euler diagram based on the identified one or more features of the log stream that vary depending on device type.

18. The computer system of claim 12, further comprising program instructions to:

identify a plurality of log streams originating from the first device; and determine a probability the plurality of log streams originating from the first device correspond to a known device type.

19. The computer system of claim 18, wherein program instructions to determine a probability the plurality of log streams originating from the first device corresponds to a known device further comprises program instructions to:

determine a total number of log characteristics of the plurality of log streams originating from the first device that correspond to log characteristics of the plurality of log streams that correspond to a specific known device type;

determine a total number of log characteristics of the plurality of log streams from the first device that do not correspond to the characteristics of the plurality of log streams that correspond to a specific known device type; and determine the probability that the plurality of log streams originating from the first device correspond to the specific known device type based on the determined total number of characteristics of the one or more log streams of the plurality of log streams that correspond to a specific known device type and the determined total number of characteristics of the one or more log streams of the plurality of log streams that do not correspond to the specific known device type.

20. The computer system of claim 12, wherein the identified features include a computer name, a time stamp, an Internet Protocol Address, one or more spaces, and one or more punctuation.

* * * * *